Patented Jan. 19, 1954

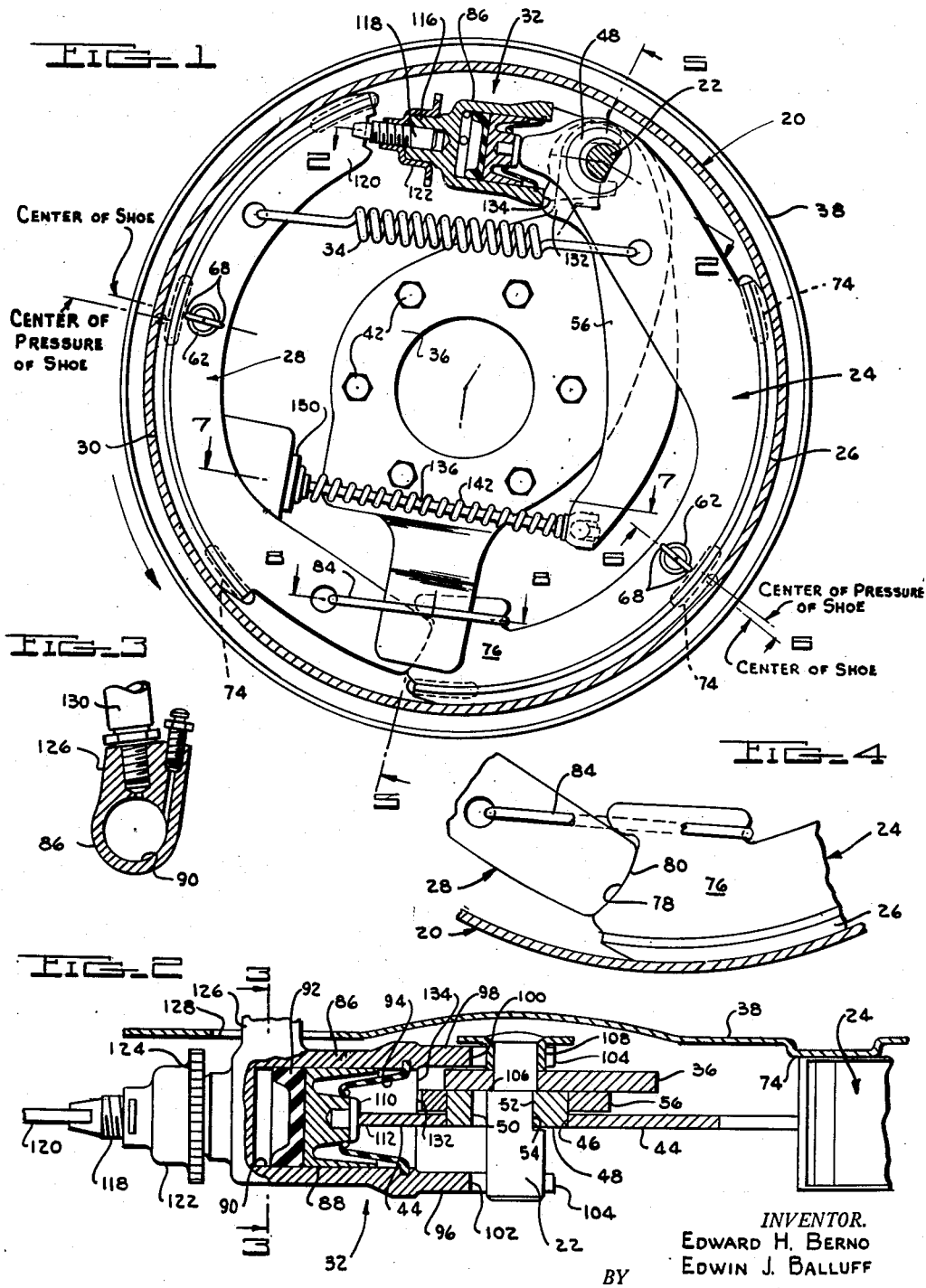

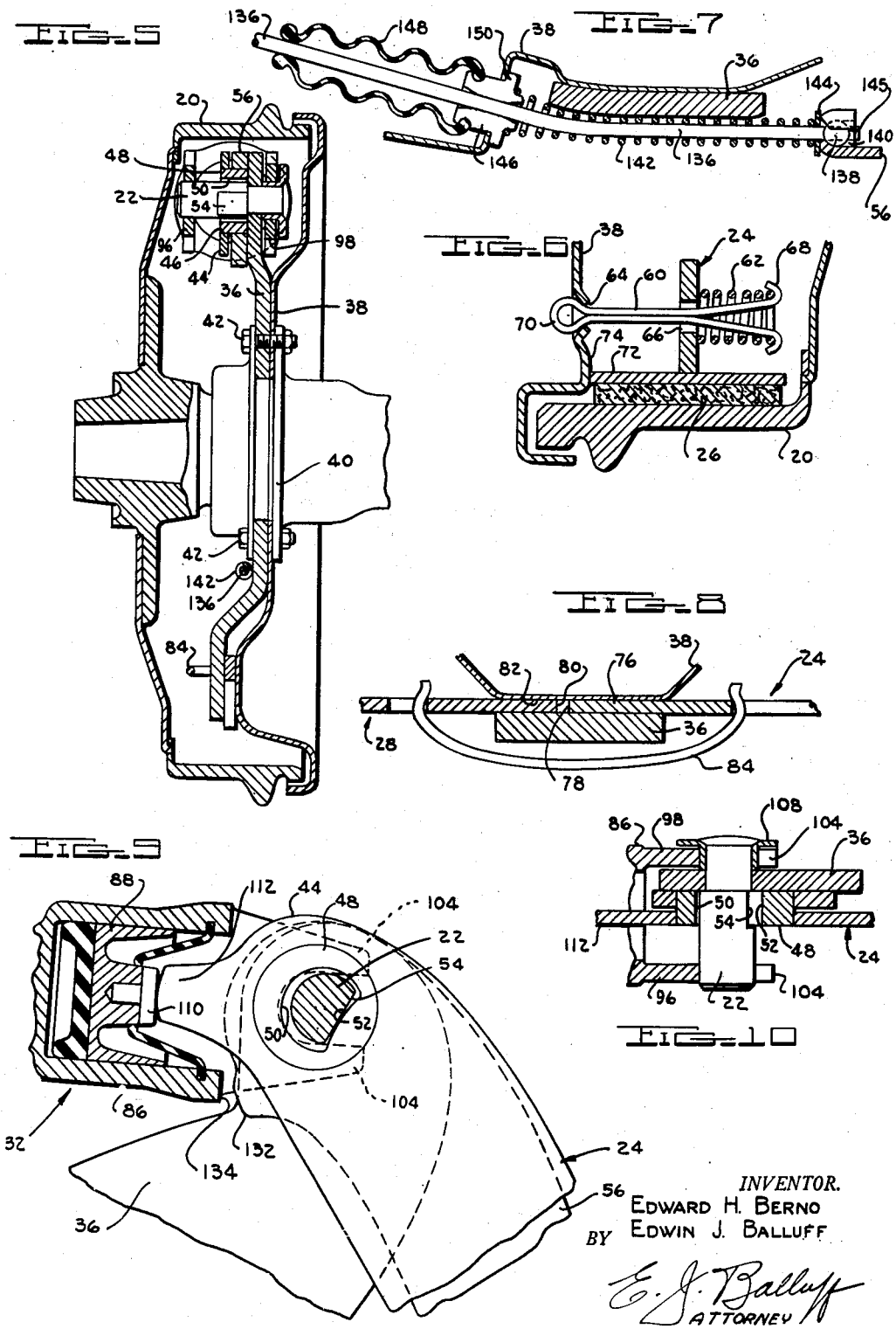

2,666,504

UNITED STATES PATENT OFFICE 2,666,504

BRAKE

Edward H. Berno, Plymouth, and Edwin J. Balluff, Farmington, Mich.

Application October 7, 1949, Serial No. 120,138

5 Claims. (Cl. 188—152)

This invention relates to brakes and has particular reference to wheel brake structure.

A principal object of the invention is to provide a new and improved brake.

Another object of the invention is to provide a new and improved brake structure which is more efficient in performance and less expensive to manufacture than brakes now available.

Other and further objects of the invention will be apparent from the following description and claims and may be understood by reference to the accompanying drawings, of which there are two sheets, which by way of illustration show a preferred embodiment of the invention and what we now consider to be the best mode in which we have contemplated applying the principles of our invention. Other embodiments of the invention may be used without departing from the scope of the present invention as set forth in the appended claims.

In the drawings:

Fig. 1 is an elevational view of the wheel brake structure with certain parts shown in section;

Fig. 2 is an enlarged fragmentary sectional view taken along the line 2—2 of Fig. 1, looking in the direction of the arrows;

Fig. 3 is a section taken along the line 3—3 of Fig. 2, looking in the direction of the arrows;

Fig. 4 is an enlarged fragmentary elevational view of the articulated connection between the shoes;

Fig. 5 is a sectional view taken along the line 5—5 of Fig. 1, looking in the direction of the arrows;

Fig. 6 is an enlarged fragmentary sectional view taken along the line 6—6 of Fig. 1;

Fig. 7 is an enlarged sectional view taken along the line 7—7 of Fig. 1, looking in the direction of the arrows;

Fig. 8 is an enlarged sectional view taken along the line 8—8 of Fig. 1;

Fig. 9 is an enlarged fragmentary elevational view illustrating the relationship between the anchor pin, the secondary shoe and the brake applying means in the released position of the brake; and Fig. 10 is a fragmentary view similar to Fig. 2 but showing the relationship of the brake shoe and the brake applying means to the anchor pin during reverse braking.

As illustrated in the embodiment of the invention selected for purposes of illustration, a brake embodying the invention comprises in general a drum 20, an anchor pin 22, a secondary shoe 24 having lining 26 shaped to conform with the curvature of the drum, a primary shoe 28 having lining 30 shaped to conform with the curvature of the drum, brake applying means comprising a hydraulic cylinder and piston unit 32, a brake shoe retracting spring 34, an anchor plate 36, and a dust shield 38.

The anchor plate 36 may comprise a heavy steel stamping or forging which is secured to the flange 40 of the axle housing with the dust shield 38 clamped therebetween by the bolts 42 which secure the anchor plate 36 to the flange 40. The dust shield is arranged to close the open side of the drum 20. The anchor pin 22 is suitably secured in an opening in the anchor plate 36 and projects laterally therefrom in opposite directions, as clearly shown in Figs. 2 and 10.

One end 44 of the brake shoe 24 is provided with a hole or aperture 46 in which a bushing 48 is secured. The bushing has a hole 50 therethrough through which the anchor pin 22 extends, the size of the hole relative to the cross section of the pin 22 being such as to provide a floating connection between the end 44 of the shoe and the anchor pin 22 which provides for pivotal movement of the shoe 24 about the anchor pin 22 and for floating movement of the shoe 24 with respect to the anchor pin 22 and toward and away from the drum 20 so that the shoe and the lining 26 thereof are free to conform with the curvature of the drum 20.

The bushing 48 has one side 52 of the hole 50 formed with a reverse curve portion which engages the flat 54 on the side of the pin 22. The flat 54 on the pin 22 lies in a plane which is approximately parallel to a line which extends between the center of rotation of the drum 20 and the axis of the pin 22. The brake is shown in Figs. 1 and 2 in applied position during forward rotation of the drum 20, and in this position the portion 52 seats on and reacts against the flat 54 on the pin 22.

The floating connection between the anchor pin 22 and the shoe 24 permits the shoe 24 to float on the anchor pin 22 so that the lining 26 is free to conform with drum curvature and/or distortion during brake application.

While the cross section of the shoes 24 and 28 may be of the conventional T shape, such shoes are non-rigid so as to permit deflection of the shoes during brake application in order that they may conform with the curvature of the drum 20.

The flat 54 in effect forms a tangential slot in the pin 22. The bushing 48 at one side abuts the anchor plate 36. A lever 56 is pivoted on the bushing 48 and disposed between the web of the shoe 24 and the anchor plate 36, the lever 56 forming part of a means for mechanically actuating the shoes 24 and 28.

A hold down spring arrangement as illustrated in Fig. 6 is employed for holding the shoes 24 and 28 against the dust shield 38, and this comprises a spring 62 and a cotter pin 60 which extends through oval holes 64 and 66 in the dust shield 38 and shoe 24 respectively. The coil spring 62 is assembled on the cotter pin and seated against the bent back ends 68 of the legs thereof. The head 70 of the pin 60 is then passed through the oval shaped holes 66 and 64. Thereafter the pin 60 is turned ninety degrees and seated in a cross slot in the dust shield 38 which prevents the pin 60 from turning, the tension of the spring 62 holding the head 70 of the pin seated in the cross slot in the dust shield 38. The pin 60 and spring 62 hold the edge of the back 72 of the shoes 24 and 28 against inwardly offset flats 74 on the shield 38.

The other end 76 of the shoe 24 is provided with a curved surface 78 upon which the curved end 80 of the shoe 28 seats, this arrangement providing a pivotal mounting for the shoe 28 on the end 76 of the shoe 24. Referring to Fig. 8, it will be observed that the articulated ends of the shoes 24 and 28 are confined between an extension of the anchor plate 36 and a flat 82 formed on the dust shield 38. A spring 84 engaged at one end in a hole in the shoe 28 and at its other end in a notch in the shoe 24 biases the surfaces 78 and 80 into pivotal relation.

The hydraulic cylinder and piston unit 32 comprises a cylinder member 86, a piston member 88 reciprocably arranged in the cylinder 90 of the member 86, a cup-shaped member 92 of resilient material, such as rubber, seated on the face of the piston 88, and a flexible boot 94 which extends between the piston 88 and the inner wall of the cylinder member 86 so as to form a dirt seal therebetween.

The cylinder member 86 is provided with forks 96 and 98 which straddle the end 44 of the shoe 24 and the anchor plate 36. Each of the forks is bifurcated, forming slots 100 and 102 through which the anchor pin 22 extends, and fingers 104 which straddle the pin 22.

The pin 22 is provided with a portion of reduced diameter which forms a shoulder 106 which seats against the anchor plate 36. A bushing 108 is secured on the reduced portion of the pin 22 so that the slots 100 and 102 between the fingers 104 may both be of the same size. The pin 22 forms a pivotal mounting for the cylinder member 86.

The piston 88 is provided with a button 110 which is adapted to seat against a boss or projection 112 on the end 44 of the brake shoe 24. During braking upon forward rotation of the drum, and in which position the parts are shown in Figs. 1 and 2, the piston 88 seats on the end of the shoe 24 through the contact between the button 110 and the projection 112. The rotation of the drum causes the brake shoes 24 and 28 to tend to turn with the drum, thereby causing the curved portion 52 of the shoe 24 to seat against the flat 54 on the pin 22.

The introduction of hydraulic fluid into the cylinder 90 from the conventional master cylinder causes the piston 88 and the cylinder member 86 to move apart. The cylinder member 86 is provided with a circular boss 116 which slidably receives a pin or link 118. The other end of the pin 118 is bifurcated and engages the web 120 of the shoe 28 so as to react thereagainst upon actuation of the unit 32. A cap 122 is threaded on the threaded portion of the pin 118 and seats on the circular boss 116. Rotation of the cap 122 in one direction or the other will project or retract the pin 118 so as to adjust the effective length of the cylinder member 86. The cap 122 is provided with a notched flange 124 which may be engaged by a suitable tool through an opening in the dust shield 38 for adjusting the same. Suitable means are provided to prevent accidental rotation of the cap 122 on the pin 118.

The cylinder member 86 is provided with an integral boss 126 which extends through an opening in the dust shield 38 and is provided with a threaded opening so that one end of a fluid pressure line 130 may be connected to the cylinder member 86 in order to supply pressure fluid to the cylinder 90 thereof when it is desired to apply the brakes. The boss 126 extends freely through the opening 128 in the dust shield 38 so as not to interfere with the pivotal and sliding movement of the cylinder member 86.

When fluid under pressure is introduced into the cylinder 90, the cylinder member 86 and piston member 88 will move away from each other, the piston member 88 reacting on the projection 112 of the shoe 24 and the cylinder member 86 reacting on the web 120 at the free end of the shoe 28. Application of sufficient pressure fluid to the cylinder 90 will overcome the force of the retracting spring 34 and engage the lining on the shoes 24 and 28 with the drum 20. Rotation of the drum in a forward direction will cause the portion 52 of the shoe to seat on the flat 54 and react thereagainst.

The shoe 28 not only is self-energizing, but also produces a servo effect on the shoe 24 since the shoe 28 is pivoted on the end of the shoe 24. The shoe 28 and the piston 88 will effect the application of the shoe 24 to the drum, although the anchor pin 22 will take the braking torque reaction of both shoes 24 and 28. When the pressure fluid is released from the cylinder 90, the retracting spring 34 will retract the piston 88 and cylinder 86 relative to each other and also retract the shoes 24 and 28 from operative engagement with the drum 20.

Fig. 10 shows the relationship of the cylinder member 86 and the shoe 24 and the bushing 48 relative to the anchor pin 22 during reverse braking. Under these conditions it will be observed that the slotted end of the forks 98 and 96 of the cylinder member seats against the anchor pin 22, the piston 88 reacting on the projection 112 to push the shoe 24 into engagement with the drum. The shoe 24 under these conditions will act as the primary shoe and move the shoe 28 into operative engagement with the drum which during reverse braking functions as the secondary shoe. It will be observed by reference to Fig. 1 that the center of both of the shoes is located approximately at the center of pressure of both shoes, as indicated.

The cylinder member 86 also forms part of a means for mechanically actuating the brake shoes and cooperates with the lever 56 for this purpose. The lever 56 is provided with a boss 132 which is engageable with a shoulder 134 on the cylinder member 86 for mechanically applying the brakes, the boss 132 being shown in engagement with the shoulder 134 in Fig. 1. The lever 56 is pivoted on the bushing 48 so that when the lever 56 swings in a clockwise direction about its pivot it will react on the cylinder 86 and thereby force the shoes 24 and 28 into braking engagement with the drum 20. The lever 56 is shown in its released position in Fig. 9.

A cable 136 is provided with a ball 138 on one end thereof which is arranged in a socket 140 formed on the lower end of the lever 56. The socket 140 is formed by reversely bending the end of lever 56 so as to define the socket 140 and to leave a slot between the reversely bent portion and the main portion of the lever 56 so that the ball 138 may be arranged in the socket with the cable 136 attached thereto.

A coil spring 142 is disposed around the cable 136 and confined between a washer 144 abutting the socket 140 and a two-part bushing 146 which is secured in an opening in the dust shield 38. The cable 136 extends through the bushing 146 and is connected to a suitable lever whereby the lever 56 may be actuated to mechanically set the brakes. A boot 148 is connected at one end to the part of the bushing 146 disposed externally of the dust shield 38 and has a sliding fit on the cable 136 so as to prevent entrance of dirt into the brake through the bushing 146 or the hole in the dust shield 38 in which the bushing 146 is arranged. The anchor plate 36 forms a surface on which the spring 142 is slidable.

The bushing 146 is made in two equal parts and one end of the spring 142 seats thereagainst. The bushing is provided with an annular shoulder 150 which seats around the edge of the hole in the dust shield 38 through which the bushing 146 extends. In order to separate the bushing 146 from the dust shield 38, the boot 148 is separated from the bushing 146 and the bushing is thereupon moved to the right along the cable and against the tension of the spring 142. After the bushing 146 has cleared the hole in the dust shield 38, the two parts thereof will separate radially.

If it is desired to disconnect the cable 136 from the lever 56, the ball 138 may be lifted out of the socket 140 by passing the cable 136 through the slot 145 which forms the entrance to the socket.

To assemble, the cable 136 and ball 138 may be assembled by reversing the operations just described. The spring 142 moves the lever 56 to its retracted or inoperative position as shown in Fig. 9 when the tension on the cable 136 is released.

While we have illustrated and described a preferred embodiment of our invention, it is understood that this is capable of modification and we therefore do not wish to be limited to the precise details set forth but desire to avail ourselves of such changes and alterations as fall within the purview of the following claims.

We claim:

1. Brake structure comprising a drum, an anchor plate, an anchor pin secured to said anchor plate and projecting from opposite sides thereof, a secondary brake shoe shaped to conform with the curvature of said drum, one end of said secondary shoe having a floating connection with said anchor pin providing for floating movement of said secondary shoe relative to said anchor pin toward and away from said drum, a primary shoe having one end thereof reacting against the other end of said secondary shoe and shaped to conform with the curvature of said drum, a hydraulic piston and cylinder unit having one pressure applying part reacting on said one end of said secondary shoe and the other pressure applying part thereof reacting on the other end of said primary shoe for forcing said shoes into engagement with said drum upon actuation of said unit, said shoes and said hydraulic unit being supported solely by said anchor pin and being free to float thereon, said secondary shoe reacting against said anchor pin for transmitting the braking torque of both shoes to said anchor pin upon brake application in one direction of drum rotation, said one pressure applying part of said unit having arms straddling said anchor plate and engageable with said anchor pin on opposite sides of said anchor plate for transmitting thereto the braking torque of both shoes upon brake application in the other direction of drum rotation.

2. Brake structure comprising a drum, an anchor pin, a secondary brake shoe shaped to conform with the curvature of said drum, one end of said secondary shoe having a floating connection with said anchor pin providing for floating movement of said secondary shoe relative to said anchor pin and toward and away from said drum, a primary shoe having one end thereof provided with an articulated connected with the other end of said secondary shoe and shaped to conform with the curvature of said drum, a hydraulic piston and cylinder unit having one pressure applying part reacting on said one end of said secondary shoe and the other pressure applying part thereof reacting on the other end of said primary shoe for forcing said shoes into engagement with said drum, said shoes and said unit being supported solely by said anchor pin and being free to float thereon, said secondary shoe reacting against said anchor pin for transmitting the braking torque of both shoes to said anchor pin upon brake application in one direction of drum rotation, said one pressure applying part of said unit being engageable with said anchor pin for transmitting thereto the braking torque of both shoes upon brake application in the other direction of drum rotation.

3. Brake structure comprising a rotatable drum, a fixed anchor member, a pair of articulated brake shoes shaped to conform with the curvature of the drum, an actuating unit having two relatively movable members reacting on the non-articulated ends of said shoes for forcing said shoes into engagement with said drum upon actuation of said unit, said shoes and said unit being supported solely by and having a floating connection with said anchor member whereby the braking torque of both shoes is transmitted to said anchor member upon actuation of said unit in both directions of drum rotation.

4. Brake structure comprising a rotatable drum, a fixed anchor member, a pair of articulated brake shoes shaped to conform with the curvature of the drum, an actuating unit having two relatively movable members reacting on the non-articulated ends of said shoes for forcing said shoes into engagement with said drum upon actuation of said unit, one of said shoes having a floating connection with said anchor member and reacting thereagainst for transmitting the braking torque of both shoes to said anchor member upon actuation of said unit in one direction of drum rotation, one of said members of said unit having a connection with said anchor member providing for relative movement therebetween, said one member reacting against said anchor member for transmitting thereto the braking torque of both shoes upon actuation of said unit in the other direction of drum rotation.

5. Brake structure comprising a drum, an anchor pin, a secondary brake shoe shaped to conform with the curvature of said drum, a floating connection between one end of said shoe and said anchor pin which provides for pivotal movement of said shoe about said anchor pin and for floating movement of said shoe with respect to said anchor pin, and toward and away from said drum, so that the shoe is free to conform with the curvature of the drum, said pin having a flat thereon and said shoe having a curved end engageable with said flat and adapted to bear thereagainst during brake application in one direction, said flat being substantially parallel to a drum radius extending through the axis of said pin whereby said end of said shoe moves substantially along said radius toward said drum upon brake application in said one direction of drum rotation, a primary shoe having one end thereof pivoted to the other end of said secondary shoe and shaped to conform with the curvature of said drum, and means reacting on said one end of said secondary shoe and the other end of said primary shoe for forcing said shoes into engagement with said drum, said anchor pin being operable for taking all of the braking torque of both shoes during brake application in both directions of drum rotation.

EDWARD H. BERNO.
EDWIN J. BALLUFF.

References Cited in the file of this patent
UNITED STATES PATENTS

| Number | Name | Date |
|---|---|---|
| 2,209,772 | Goepfrich et al. | July 30, 1940 |
| 2,266,728 | Ambrose | Dec. 23, 1941 |
| 2,347,239 | Berno | Apr. 25, 1944 |
| 2,404,054 | Goepfrich | July 16, 1946 |